United States Patent
Jang et al.

(10) Patent No.: US 7,450,296 B2
(45) Date of Patent: Nov. 11, 2008

(54) METHOD AND SYSTEM FOR PATTERNING ALIGNMENT MARKS ON A TRANSPARENT SUBSTRATE

(75) Inventors: Ruei-Hung Jang, Jhubi (TW); Ya-Wen Lee, Taichung (TW); Tzu-Yang Wu, Hsinchu (TW); Sheng-Liang Pan, Hsin-Chu (TW); Chin-Hsiang Lin, Hsin-Chu (TW); Tsai-Sheng Gau, Hsin-Chu (TW)

(73) Assignee: Taiwan Semiconductor Manufacturing Company, Ltd., Hsin-Chu (TW)

(*) Notice: Subject to any disclaimer, the term of this patent is extended or adjusted under 35 U.S.C. 154(b) by 148 days.

(21) Appl. No.: 11/400,974

(22) Filed: Apr. 10, 2006

(65) Prior Publication Data

US 2007/0177244 A1    Aug. 2, 2007

Related U.S. Application Data

(60) Provisional application No. 60/763,265, filed on Jan. 30, 2006.

(51) Int. Cl.
*G02B 26/00* (2006.01)
*G02B 26/08* (2006.01)

(52) U.S. Cl. ...................... 359/290; 359/223

(58) Field of Classification Search ............. 359/198, 359/223, 290–292, 298
See application file for complete search history.

(56) References Cited

U.S. PATENT DOCUMENTS

| | | | |
|---|---|---|---|
| 6,083,806 A * | 7/2000 | Mancini et al. | 438/401 |
| 6,356,378 B1 | 3/2002 | Huibers | |
| 6,529,310 B1 | 3/2003 | Huibers et al. | |
| 6,947,196 B2 | 9/2005 | Chen et al. | |
| 2004/0012838 A1* | 1/2004 | Huibers | 359/291 |

* cited by examiner

*Primary Examiner*—William C Choi
(74) *Attorney, Agent, or Firm*—Haynes Boone, LLP (57) ABSTRACT

Disclosed is a method and a system for forming alignment marks on a transparent substrate. A light reflective layer is deposited over an optically transparent substrate of a wafer. A region is defined around an alignment mark on the optically transparent substrate. The light reflective layer is removed from a substantial portion of the transparent substrate excluding the region. In addition, a micro electro-mechanical systems device is disclosed. The device comprises an optically transparent substrate, at least one optically partially transparent alignment mark on the optically transparent substrate, and a plurality of reflective elements or imaging pixels attached to the optically transparent substrate.

12 Claims, 10 Drawing Sheets

METHOD AND SYSTEM FOR PATTERNING ALIGNMENT MARKS ON A TRANSPARENT SUBSTRATE

RELATED APPLICATIONS

This application claims priority to U.S. Application No. 60/763265 filed Jan. 30, 2006, entitled "Method and System for Patterning Alignment Marks on a Transparent Substrate."

BACKGROUND

The present disclosure relates in general to fabrication of micro electro-mechanical systems (MEMS) devices, and more particularly, to patterning alignment marks on a transparent substrate in the fabrication of MEMS devices. Still more particularly, the present disclosure relates to a method and system for patterning alignment marks on a transparent substrate for a substrate spatial light modulator having a plurality of reflective elements.

Deformable-mirror spatial light modulators (also referred to as digital light processors, deformable mirror devices, or DMDs) typically include a plurality of movable elements, such as reflective elements or digital micro-mirrors. In a common application, the digital micro-mirror is coordinated with a digital video or graphic signal, a light source, and/or a projection lens to reflect a digital image onto a subject. Conventionally, the plurality of reflective elements are built on a single substrate such a an optically opaque silicon substrate, which also further includes one or more CMOS control circuits. The fabrication process of these conventional single substrate structures is complicated, costly, and often produces a low yield.

A double substrate spatial light modulator may be used to fabricate one or more MEMS devices. The double substrate spatial light modulator typically comprises a plurality of reflective elements, each having a front surface that faces an optically transparent substrate and a back surface that faces an optically opaque substrate, for example, a semiconductor silicon substrate. The reflective elements may be selectively deflected or twisted to spatially modulate light incident to the upper substrate (optically transparent substrate) to reflect light back to the upper substrate. The twist angle of the reflective elements may be controlled by adjusting an input voltage of the driving device. Thus, different reflection paths may be treated as on/off states.

The fabrication process of the double substrate spatial light modulator includes forming an addressing circuitry and electrodes on a semiconductor substrate. An attraction electrode is also attached to the back surface of the reflective elements. When a voltage bias is applied between an attraction electrode on a reflective element and a corresponding actuating electrode on the semiconductor substrate, the attraction electrode is pulled towards the actuating electrode, which causes the reflective element to deflect. Typically, an increased tilt angle of the reflective elements improves the contrast ratio and gray scale of the mirror projector.

In addition to electrodes, the fabrication process of the double substrate spatial light modulator includes aligning and joining of the optically transparent substrate and the semiconductor substrate. The contact areas on the optically transparent substrate and the semiconductor substrate must be patterned in the wafer level fabrication process. However, when the two substrates are joined together, blind stepping, which ignores wafer alignment marks, causes a pattern definition deviation on the optically transparent substrate. As a voltage bias is applied, the tilt angle of the reflective element motion is decreased, which degrades the contrast ratio and gray scale of the mirror projector. In addition, when an alignment laser light passes through the deposition layer, such as silicon dioxide or indium tin oxide (ITO) of the transparent substrate, for patterning, the light penetrates the optically transparent substrate and weakens the reflective light intensity detected by a photo detector. As a result, the resulting products are often defective.

Therefore, a need exists for a method and a system that accurately patterns alignment marks on a transparent substrate, such that the joining shift problem of two substrates may be reduced or eliminated. In addition, a need exists for a method and a system that accurately patterns alignment marks on a plurality of dies on the transparent substrate, such that wafer rejection by the alignment apparatus may be minimized.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. It is also emphasized that the drawings appended illustrate only typical embodiments of this invention and are therefore not to be considered limiting in scope, for the invention may apply equally well to other embodiments.

DETAILED DESCRIPTION

For the purposes of promoting an understanding of the principles of the invention, reference will now be made to the embodiments, or examples, illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Furthermore, the depiction of one or more elements in close proximity to each other does not otherwise preclude the existence of intervening elements. Also, reference numbers may be repeated throughout the embodiments, and this does not by itself indicate a requirement that features of one embodiment apply to another embodiment, even if they share the same reference number.

Figure 1:
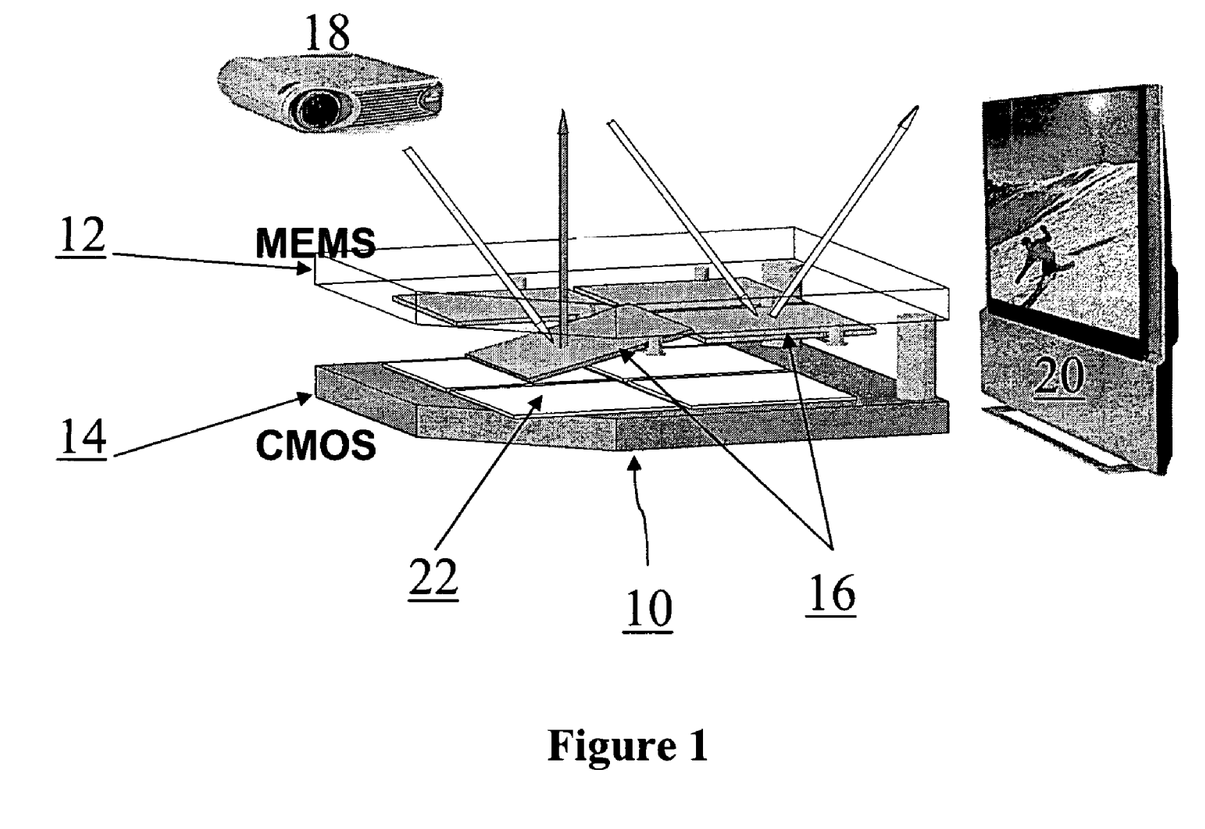
FIG. 1 is a diagram illustrating an exemplary deformable mirror device (DMD) micro electro-mechanical systems (MEMS) device.

Referring to FIG. 1, an exemplary deformable mirror device (DMD) micro electro-mechanical systems (MEMS) device 10 is an example of a device that can benefit from one or more embodiments of the present invention. The DMD MEMS device 10 includes two substrates: an optically transparent substrate 12 and a semiconductor substrate 14 with a CMOS control circuit. A plurality of mirrors or reflective elements 16 are attached to the optically transparent substrate 12. Each mirror or reflective element 16 may be made of aluminum-based material and each represents a pixel. When DMD MEMS device 10 is coordinated with a digital signal or graphic signal, a light source, or a projection lens 18, the reflective elements 16 reflect a digital image onto a screen 20. In this example, an attractive electrode is attached to back surface of the reflective element 16 and the attraction electrode is pulled toward a corresponding actuating electrode 22 on the semiconductor substrate 14 as the voltage bias is applied between the two substrates, which causes the reflective elements 16 to deflect. Typically, the larger the tilt angle of the reflective elements 16, the better the contrast ratio and gray scale of the DMD MEMS device 10.

As will be discussed in greater detail below, the DMD MEMS device 10 is constructed by forming at least one optically partially transparent alignment mark on the optically transparent substrate 12. The optically partially transparent alignment mark can then be used to align to the reflective elements 16 on the optically transparent substrate to the semiconductor substrate 14. When properly aligned, the semiconductor substrate 14, which may include one or more CMOS control circuits, can be electrically coupled with the optically transparent substrate via the at least one optically partially transparent alignment mark.

Figure 2:
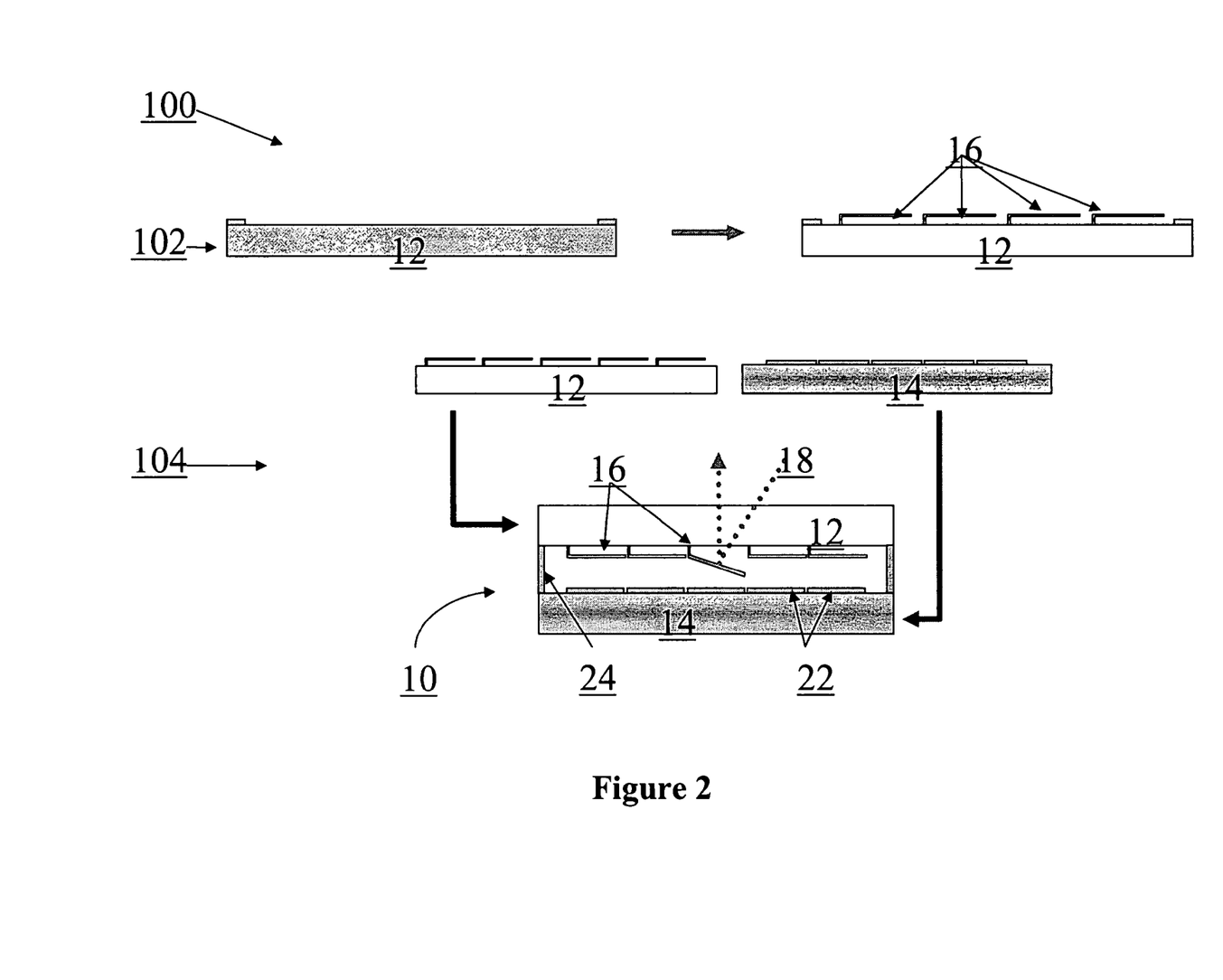
FIG. 2 a diagram illustrating blind stepping and joining of optically transparent substrate and the semiconductor substrate.

Referring now to FIG. 2, a flow chart 100 provides an embodiment of manufacturing the DMD MEMS device 10 of FIG. 1 using a blind stepping and joining technique. At step 102, alignment of transparent substrate 12 is ignored and the reflective elements 16 are patterned onto the transparent substrate 12 without alignment marks (blind stepping). At step 104, the transparent substrate 12 is joined with the semiconductor substrate 14 to form the DMD MEMS device 10 using optically partially transparent alignment marks on the transparent substrate 12. Contact openings of the transparent substrate 12 and the semiconductor substrate 14 are also precisely defined to facilitate the joining operation. In some embodiments, overlap of the contact area 24 would cause deviation of relative positions of the attraction electrode on the backside of the reflective elements 16 and the actuating electrodes 22 of the semiconductor substrate 14. The present disclosure provides a method and system for patterning alignment marks on the optically transparent substrate 12 as discussed below.

Figure 3:
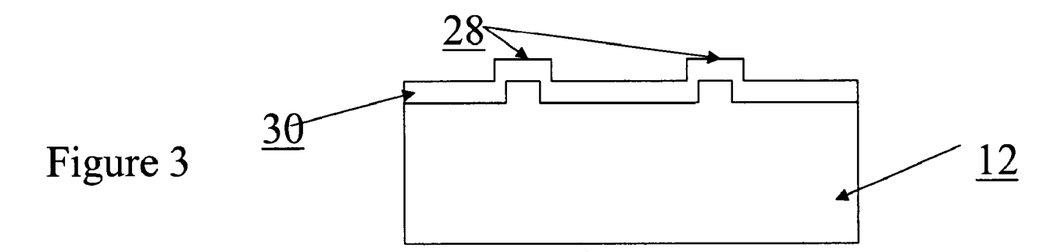
FIGS. 3-5 are diagrams illustrating one embodiment of patterning alignment marks on an optically transparent substrate.
Figure 4:
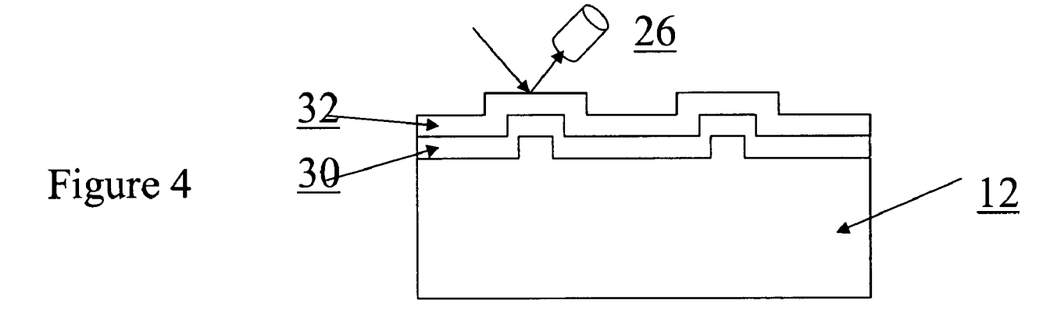
Figure 5:
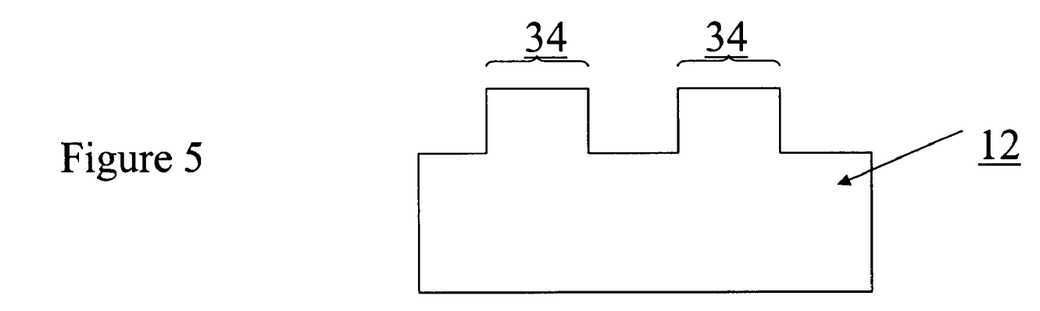

Referring to FIGS. 3-5, in one embodiment, the optically transparent substrate 12 may be made of glass, quartz, or other materials that may withstand subsequent processing temperature. As shown in FIG. 3, a first sacrificial layer 30 is deposited above alignment marks 28 of the optically transparent substrate 12. The alignment marks 28 are formed in the substrate 12 by photo lithography and plasma etching technique. The alignment marks 28 can be a grating shape having depth from about 500 A to about 3000 A. In one embodiment, the first sacrificial layer 30 is made of silicon such as polysilicon or amorphous silicon and has a thickness of about 50 A to 500 A. The first sacrificial layer 30 may be deposited by chemical vapor deposition (CVD) or sputter or other techniques that deposit a film on the wafer. In addition, sacrificial material other than silicon may also be used without departing from the spirit and scope of the present disclosure.

As shown in FIG. 4, a second sacrificial layer 32 is deposited over the first sacrificial layer 30 in FIG. 3. In one embodiment, the second sacrificial layer 32 also has a thickness of about 50 A to 1000 A. The second sacrificial layer 32 is made of a metallic material, such as tungsten or titanium. The second sacrificial layer 32 may be deposited by plasma sputtering or other techniques that deposit a film on the wafer. The second sacrificial layer 32 is formed as a reflective structure to prevent the alignment laser light from penetrating the optically transparent substrate 12. Thus, with the reflective second sacrificial layer 32, the reflective light intensity would be intensive enough to be detected by the photo detector 26. The first sacrificial layer 30 serves as an adhesive layer to prevent metallic material of the second sacrificial layer 32 peeling from the optically transparent substrate 12.

As shown in FIG. 5, after the first and second sacrificial layers are deposited, regions 34 around alignment marks 28 are patterned using a photo resist. In one embodiment, the first sacrificial layer 30 and the second sacrificial layer 32 are etched to expose a substantial portion of the optically transparent substrate 12, excluding regions 34, such that subsequent layers may be deposited thereon. In an alternative embodiment, several openings may be etched through the sacrificial layers 30 and 32, such that the contact openings serve as the joining pads of the two substrates. Subsequently, the sacrificial layers 30 and 32 are etched after the micro structures are constructed. The sacrificial layers 30 and 32 may be removed by using a non-plasma vapor etch, such as Xenon Difluoride ($XeF_2$). However, other processes, such as blanket plasma dry etch or a wet etch, may also be performed without departing from the spirit and scope of the present disclosure. After the sacrificial layers 30 and 32 are removed, a reflective layer is formed over regions 34 on the optically transparent substrate 12 that accurate aligns the substrate 12.

Figure 6:
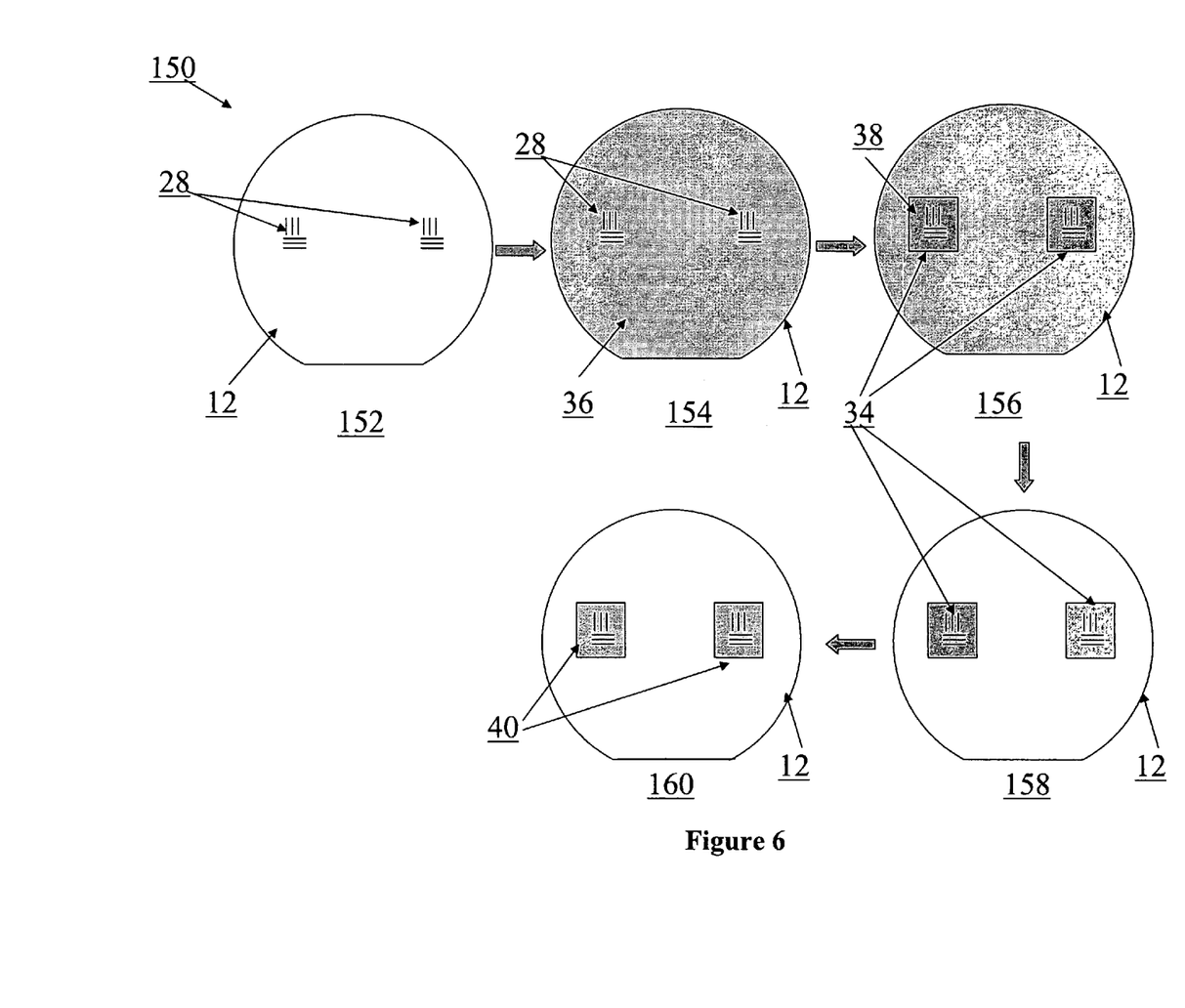
FIG. 6 is a diagram of a first embodiment of the alignment marks patterning process.

Referring to FIG. 6, alignment marks 28 located on the upper surface of optically transparent substrate 12 are further processed according to a first method 150. At step 152, the optically transparent substrate 12 includes an optically transparent film, such as indium tin oxide (ITO) or silicon dioxide ($SiO_2$). ITO film is an electrically conductive material and may be adopted between the semiconductor substrate 14 and the optically transparent substrate 12 in the DMD MEMS device 10 for electrical connections. Since optically transparent substrate 12 is made of a non-conductive material, a material, such as ITO, with transparent and conductive characteristics is used to form a double substrate DMD MEMS device 10.

At step 154, an optically partially transparent film 36 is deposited over the optically transparent substrate 12. The optically partially transparent film 36 may be made of material having low optical transparency like metallic material, such as tungsten or titanium, and has a thickness of about 50 A to 1000 A and a preferred thickness of about 50 A to 500 A. In one embodiment, the transparency of the optically partially transparent film 36 is less than 50 percent. In addition, optically partially transparent film 36 may be made of metal nitride, metal compound, metal alloy, silicon, polysilicon, or amorphous silicon. Examples of optically partially transparent film 36 include aluminum, copper, tungsten nitride, and titanium nitride. The optically partially transparent film 36 may be deposited by plasma sputtering or other techniques, such as chemical vapor deposition (CVD).

An adhesion layer may also be formed between the optically transparent substrate 12 and the optically partially transparent film 36 to prevent peeling of the optically partially transparent film 36 from the optically transparent substrate 12. The adhesion layer may be made of silicon, tungsten, or a combination of silicon and tungsten, and has a thickness of about 50 A to 500 A.

At step 156, regions 34 are defined around the alignment marks 28 for patterning. A photo resist 38 is used to cover regions 34. At step 158, the optically partially transparent film 36 is removed to expose a substantial portion of the optically transparent substrate 12 excluding regions 34. The optically partially transparent film 36 may be removed by using plasma etching or by using a non-plasma vapor etch, such as Xenon Difluoride ($XeF_2$). At step 160, after the optically partially transparent film 36 is removed, the photo resist 38 over regions 34 is removed and permanent reflective layer 40 are formed over alignment marks 28 of the optically transparent substrate 12. The photo resist 38 may be removed by using oxygen plasma or solution comprising $H_2SO_4$, like $H_2SO_4 + H_2O_2$.

Figure 7:
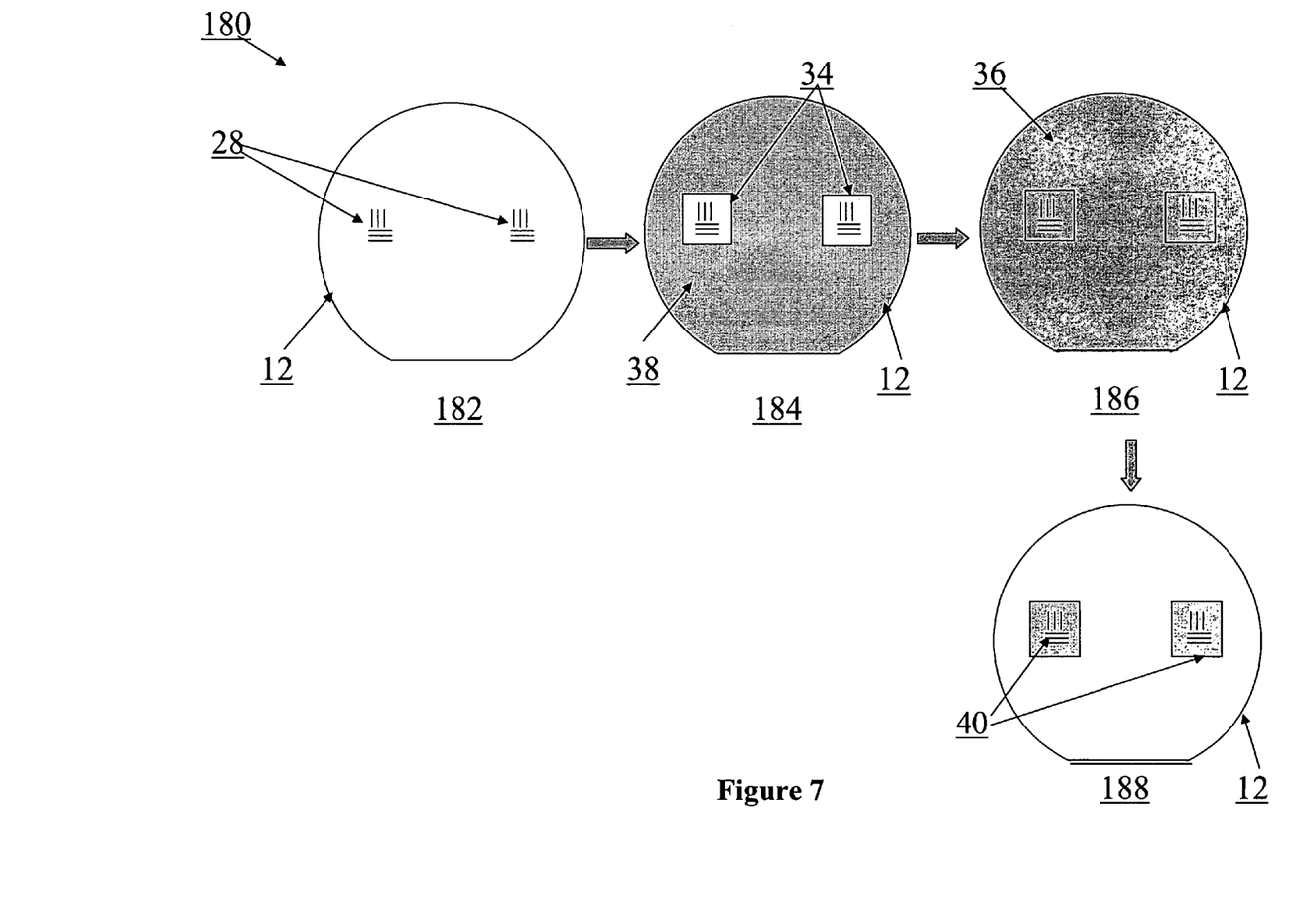
FIG. 7 is a diagram of a second embodiment of the alignment marks patterning process.

Referring to FIG. 7, a second embodiment of the alignment marks patterning process is designated with the reference numeral 180. At step 182, the alignment marks 28 are located on the upper surface of optically transparent substrate 12 of the wafer. The optically transparent substrate 12 is made of a non-conductive material, such as glass, and comprises an optically transparent film, such as indium tin oxide (ITO) or silicon dioxide ($SiO_2$). ITO film is an electrically conductive material and it may be adopted between the semiconductor substrate 14 and the optically transparent substrate 12 in the DMD MEMS device 10 for electrical connections. Since optically transparent substrate 12 is made of a non-conductive material, a film, such as ITO, with transparent and conductive characteristics is necessary to form a double substrate DMD MEMS device 10.

At step 184, a patterned photo resist 38 is used to cover a substantial portion of the optically transparent substrate, exposing regions 34 that are defined around alignment marks 38 to be patterned. At step 186, an optically partially transparent film 36 is deposited over the entire wafer, including regions 34. The optically partially transparent film 36 may be made of material having low optical transparency like metallic material, such as tungsten or titanium, and has a thickness of about 50 A to 1000 A and a preferred thickness of about 50 A to 500 A. In one embodiment, the transparency of the optically partially transparent film 36 is less than 50 percent. In addition, optically partially transparent film 36 may be made of metal nitride, metal compound, metal alloy, silicon, polysilicon, or amorphous silicon. Examples of optically partially transparent film 36 include aluminum, copper, tungsten nitride, and titanium nitride. The optically partially transparent film 36 may be deposited by plasma sputtering or other techniques, such as chemical vapor deposition (CVD).

As in the process 150, an adhesion layer may be formed between the optically transparent substrate 12 and the optically partially transparent film 36 to prevent peeling of the optically partially transparent film 36 from the optically transparent substrate 12. The adhesion layer may be made of silicon, tungsten, or a combination of silicon and tungsten, and has a thickness of about 50 A to 500 A. The silicon can be polysilicon or amorphous silicon.

At step 188, the photo resist 38 are removed by lift-off method from a substantial portion of the optically transparent substrate, so that the optically partially transparent film 36 is removed excluding regions 34 that are defined around the alignment marks 28. The photo resist 38 may be removed by using dry oxygen plasma or wet etching such as $H_2SO_4$ solution. Preferably, wet etching is used to remove the photo resist 38 by the lift-off mechanism. After lift-off of the optically partially transparent film 36 and the photo resist 38, permanent reflective layer 40 are formed over alignment marks 28 of the optically transparent substrate 12.

Figure 8:
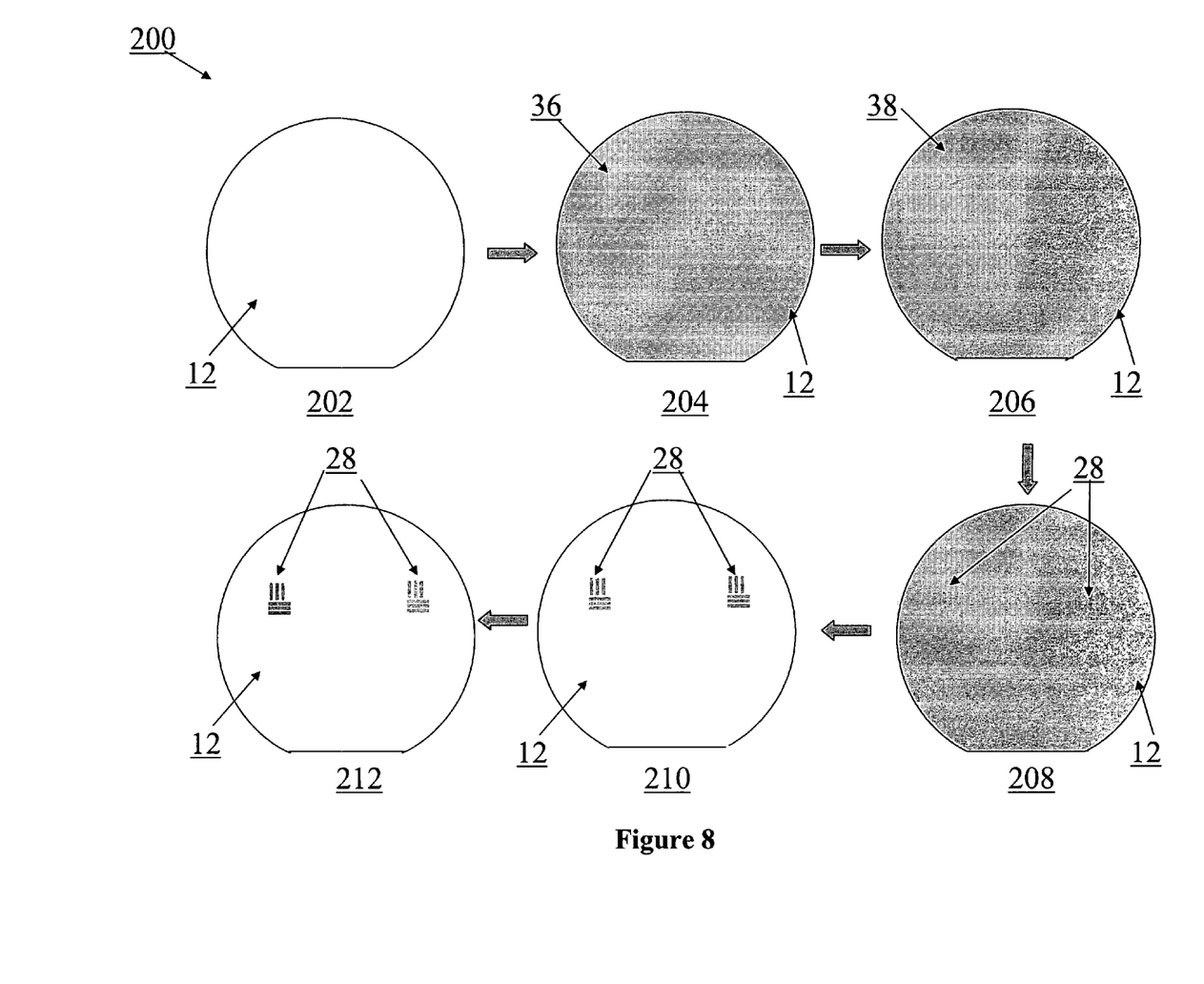
FIG. 8 is a diagram of a third embodiment of the alignment marks patterning process.

Referring to FIG. 8, a third embodiment of the alignment marks patterning process is designated with the reference numeral 200. At step 202, an optically transparent substrate 12 is provided on a wafer. The optically transparent substrate 12 is made of a non-conductive material, such as glass.

At step 204, an optically partially transparent film 36 is then deposited over the optically transparent substrate 12. The optically partially transparent film 36 may be made of material having low optical transparency like metallic material, such as tungsten or titanium, and has a thickness of about 200 A to 2500 A and a preferred thickness of about 500 A to 1500 A. In one embodiment, the transparency of the optically partially transparent film 36 is less than 50 percent. In addition, optically partially transparent film 36 may be made of metal nitride, metal compound, metal alloy, silicon, polysilicon, or amorphous silicon. Examples of optically partially transparent film 36 include refractory metal, aluminum, copper, tungsten nitride, and titanium nitride. The optically partially transparent film 36 may be deposited by plasma sputtering or other techniques, such as chemical vapor deposition (CVD).

As in processes 150 and 180, an adhesion layer may be formed between the optically transparent substrate 12 and the optically partially transparent film 36 to prevent peeling of the optically partially transparent film 36. The adhesion layer may be made of silicon, tungsten, or a combination of silicon, such as polysilicon or amorphous silicon, and tungsten, and has a thickness of about 50 A to 500 A.

At step 206, a photo resist 38 is then used to cover the optically partially transparent film 36 to photo pattern alignment marks 28. At step 208, the optically partially transparent film 36 is removed to expose the alignment marks 28. The alignment marks 28 at this point still comprises photo resist layer 38. At step 210, the optically partially transparent film 36 may be removed by using a non-plasma vapor/gas etch, such as Xenon Difluoride ($XeF_2$), or plasma etching and wet etching. After the removal of the optically partially transparent film 36, at step 212 the photo resist 38 is removed to form reflective alignment marks 28 on the optically transparent substrate 12, which comprises only the reflective metallic material. The photo resist 38 may be removed by using oxygen plasma or solution comprising $H_2SO_4$, like $H_2SO_4 + H_2O_2$. After the reflective alignment mark 28 was formed, indium tin oxide (ITO) or silicon dioxide ($SiO_2$) is deposited. ITO film is an electrically conductive material and may be adopted between the semiconductor substrate 14 and the optically transparent substrate 12 in the DMD MEMS device 10 for electrical connections. Since optically transparent substrate 12 is made of a non-conductive material, a material, such as ITO, with transparent and conductive characteristics is necessary to form a double substrate DMD MEMS device 10. Typically the semiconductor substrate is with a CMOS control circuit and electrically coupled with device formed over the optically transparent substrate 12. In addition to make reflective mirror for DLP on the optically transparent substrate 12, other device such as imaging pixel like CMOS image sensor can also be made over the optically transparent substrate 12.

Figure 9A:
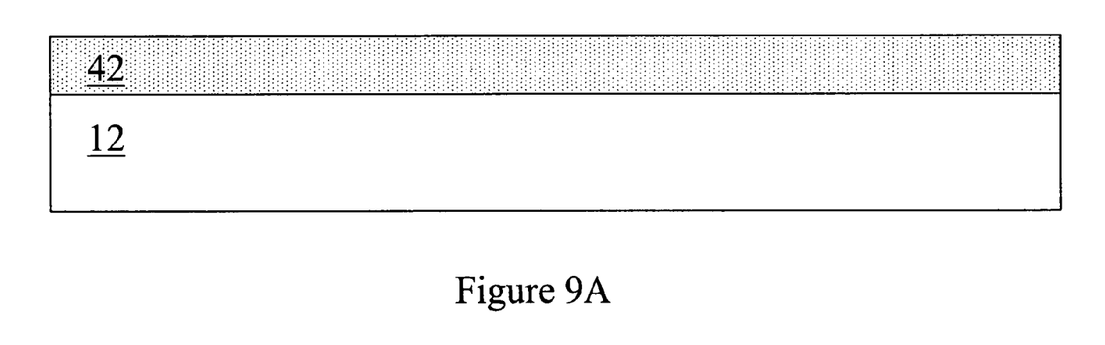
FIGS. 9A-9B are diagrams of a fourth embodiment of the alignment marks patterning process.
Figure 9B:
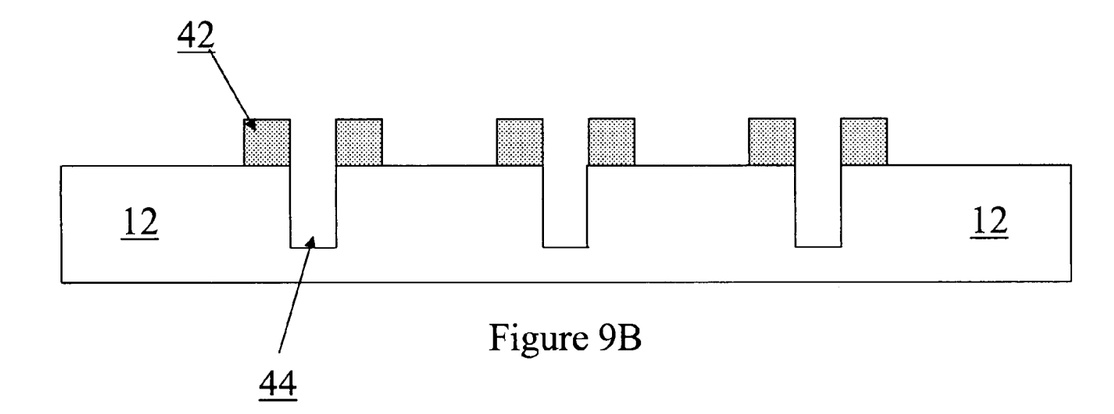

Referring to FIGS. 9A-9B, a fourth embodiment of the alignment marks patterning process is depicted. As shown in FIG. 9A, a layer of phase shift material 42 is deposited over the optically transparent substrate 12. The optically transparent substrate 12 is made of a non-conductive material, such as glass, and comprises an optically transparent film, such as indium tin oxide (ITO) or silicon dioxide ($SiO_2$). ITO film is an electrically conductive material and it may be adopted between the semiconductor substrate and the optically transparent substrate 12 in the DMD MEMS device 10 for electrical connections. Since optically transparent substrate 12 is made of a non-conductive material, a material, such as ITO, with transparent and conductive characteristics is necessary to form a double substrate DMD MEMS device 10. In an alternative embodiment, optically transparent material, optically partially transparent material, or optically opaque (semiconductor) material may also be used as the phase shift material without departing from the spirit and scope of the present disclosure.

As shown in FIG. 9B, a first pattern is then formed in the optically transparent substrate 12. In this example, the first pattern includes a trench 44 that is formed within the optically transparent substrate 12. A second pattern is also formed in the layer of phase shift material 42. Due to the beam interference caused by a phase change, the incident beam, such as an electromagnetic wave, a laser or a visible light, on the first pattern and the second pattern produce enough reflective light intensity to serve as a permanent reflective alignment mark on the optically transparent substrate 12. This permanent reflective alignment mark may be used for subsequent alignment of the optically transparent substrate 12.

Figure 10A:
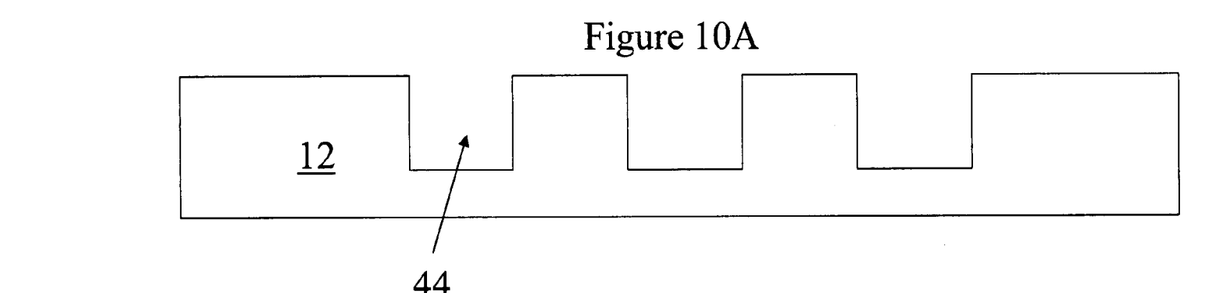
FIGS. 10A-10B are diagrams of a fifth embodiment of the alignment marks patterning process.
Figure 10B:
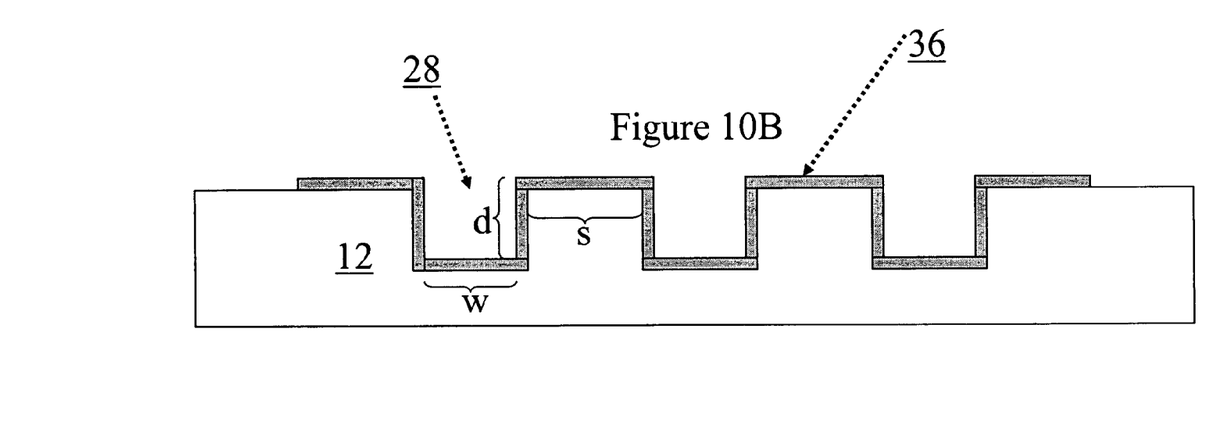

Referring to FIGS. 10A-10B, a fifth embodiment of the alignment marks patterning process is depicted. As shown in FIG. 10A, a trench pattern 44 is formed within an optically transparent substrate 12. As shown in FIG. 10B, an optically partially transparent film 36 is deposited over the optically transparent substrate 12 and is patterned to form permanent reflective alignment marks 28. The optically partially transparent film 36 may be made of metallic material, such as tungsten or titanium, and has a thickness of about 100 A to 1000 A. In one embodiment, the transparency of the optically partially transparent film 36 is less than 50 percent. In an illustrative embodiment, the alignment mark 28 has a depth d of about 500 A to 2500 A, a width w of about 4 um to 12 um, and a space s of about 4 um to 12 um.

Figure 11:
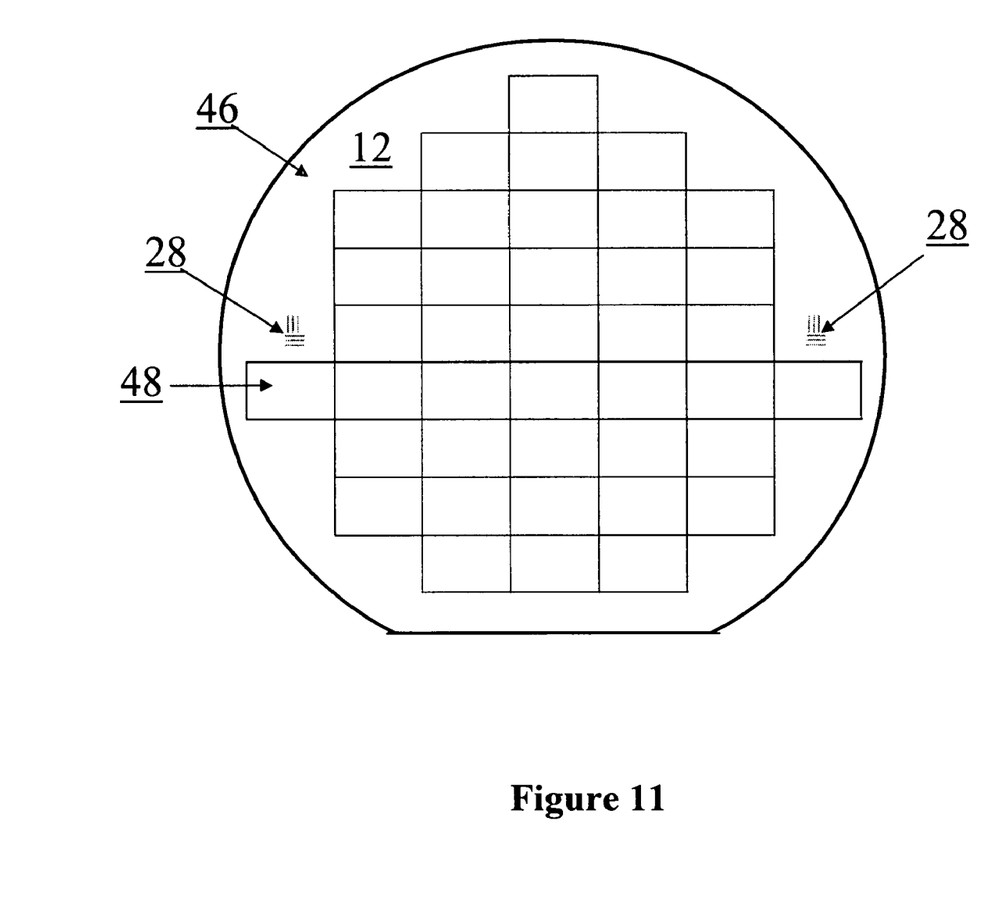
FIG. 11 is a diagram illustrating global reflective alignment marks patterned on a wafer using the alignment marks patterning process of the present disclosure.

Referring to FIG. 11, a diagram illustrating global reflective alignment marks patterned on a wafer using the alignment marks patterning process of the present disclosure is depicted. As shown in FIG. 11, wafer 46 comprises an optically transparent substrate 12. The diameter of wafer 46 may be of any size, such as between 4 inches and 30 inches. Within wafer 46 is a plurality of die 48. Each die 48 may be used for a single DMD MEMS device 10. In addition, each die 48 may be used as a chip of other devices, including an image sensor, an infrared sensor, a temperature sensor, and a pressure sensor. Global alignment marks 28 are formed on optically transparent substrate 12 using the alignment mark patterning process of the present disclosure. Global alignment marks 28 provide enough reflective light intensity to be detected by the photo detector 26. As a result, wafer 46 will not be rejected by the alignment apparatus.

Figure 12:
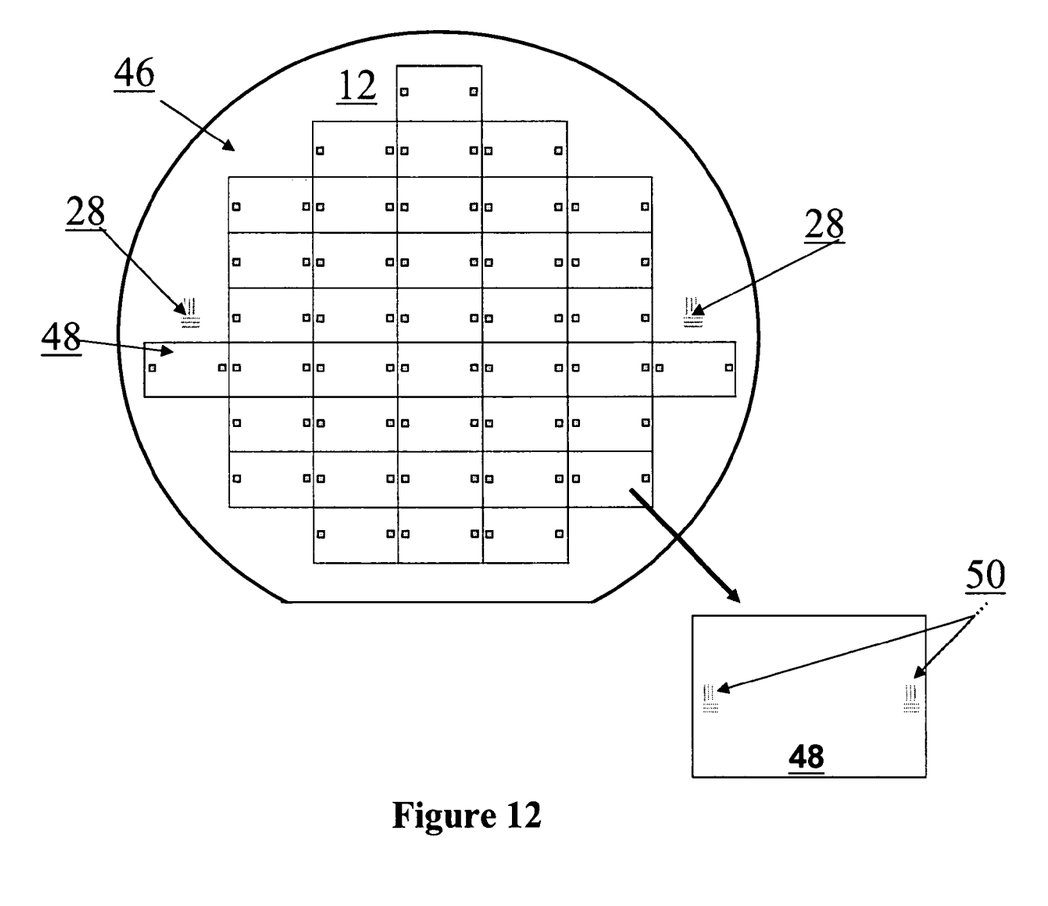
FIG. 12 is a diagram illustrating die-by-die reflective alignment marks patterned using the alignment marks patterning process of the present disclosure.

Referring to FIG. 12, a diagram illustrating die-by-die reflective alignment marks patterned using the alignment marks patterning process of the present disclosure is depicted. In addition to global alignment marks 28 that are formed on optically transparent substrate 12, each die 48 comprises its own alignment marks, known as die-by-die alignment marks 50. Die-by-die alignment marks 50 are patterned on the optically transparent substrate 12 using the alignment mark patterning process of the present disclosure. Die-by-die alignment marks 50 provide enough reflective light intensity to be detected by the photo detector 26. As a result, each die 48 will not be rejected by the alignment apparatus. In addition, Die-by-die alignment marks 50 provide accurate die alignment to overcome the joining shift problem when forming the DMD MEMS device 10.

Referring again to FIG. 2, the optically transparent substrate 12 with the global alignment marks 28 and/or the die-by-die alignment marks 50 can then be easily and accurately aligned with the substrate 14.

In summary, the alignment marks patterning process of the present disclosure provides more accurate wafer alignment on an optically transparent substrate. In turn, deviated pattern definition on the optically transparent structure in the wafer level fabrication process is prevented. In addition, reflective elements that are more mechanically robust are provided in the alignment joining of the optically transparent substrate. Better alignment helps in stabilizing the tilt angle of the mirror motion, which leads to steady contrast ratio and gray scale of the mirror projector. For example, with a single semiconductor substrate, the contrast ratio of the mirror projector is about 800 to 1. After using the patterning process of the present disclosure, the contrast ratio of the mirror projector is significantly improved to at least 1000 to 1.

It is to be understood that the following disclosure provides different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not itself dictate a relationship between various embodiments and/or configurations discussed.

What is claimed is:

1. A device over optically transparent substrate comprising:
   a substantially optically transparent substrate;
   at least one optically partially transparent alignment mark on the optically transparent substrate, wherein the at least one optically partially transparent alignment mark comprises at least one optically transparent layer; and
   a plurality of reflective mirrors attached to the substantially optically transparent substrate.

2. The device of claim 1, wherein the at least one optically partially transparent alignment mark further comprises at least one permanent reflective layer.

3. A device over optically transparent substrate comprising:
   a substantially optically transparent substrate;
   at least one optically partially transparent alignment mark on the optically transparent substrate, wherein the at least one optically partially transparent alignment mark comprises at least one optically transparent layer; and
   a plurality of imaging pixels attached to the substantially optically transparent substrate.

4. The device of claim 3, wherein the at least one optically partially transparent alignment mark further comprises at least one permanent reflective layer.

5. A micro electro-mechanical systems (MEMS) device comprising:
   an optically transparent substrate;

at least one optically partially transparent alignment mark on the optically transparent substrate, an optically transparent layer on the at least one optically partially transparent alignment mark;

a plurality of reflective elements attached to the optically transparent substrate; and a second substrate aligned with the optically transparent substrate and coupled with the optically transparent substrate to actuate the plurality of reflective elements.

6. The device of claim 5, wherein the optically transparent substrate is a chip or die of imaging device.

7. The device of claim 5, wherein the optically transparent substrate is a wafer with a diameter from about 4 inches to about 30 inches.

8. The device of claim 5, wherein the optically partially transparent alignment mark is made of a metallic material.

9. The device of claim 5, wherein the device further comprises:

an optically transparent layer on the optically transparent substrate.

10. The device of claim 5, wherein the optically partially transparent alignment mark has a thickness of about 100 A to about 1000 A.

11. The device of claim 5, wherein the second substrate is a semiconductor substrate with a CMOS control circuit, and wherein the semiconductor substrate is electrically coupled with the device formed over the optically transparent substrate.

12. Amended) A micro electro-mechanical systems (MEMS) device comprising:

an optically transparent substrate:

at least one optically partially transparent alignment mark on the optically transparent substrate:

a plurality of reflective elements attached to the optically transparent substrate, wherein the plurality of reflective elements is made of an aluminum-based material; and a second substrate aligned with the optically transparent substrate and coupled with the optically transparent substrate to actuate the plurality of reflective elements.

* * * * *